US010547137B2

(12) United States Patent
Chang

(10) Patent No.: US 10,547,137 B2
(45) Date of Patent: Jan. 28, 2020

(54) ELECTRICAL CONNECTOR

(71) Applicant: LOTES CO.. LTD, Keelung (TW)

(72) Inventor: Wen Chang Chang, Keelung (TW)

(73) Assignee: LOTES CO., LTD, Keelung (TW)

( * ) Notice: Subject to any disclaimer, the term of this patent is extended or adjusted under 35 U.S.C. 154(b) by 0 days.

(21) Appl. No.: 16/358,986

(22) Filed: Mar. 20, 2019

(65) Prior Publication Data

US 2019/0296474 A1 Sep. 26, 2019

(30) Foreign Application Priority Data

Mar. 20, 2018 (CN) .......................... 2018 1 0227323

(51) Int. Cl.

| H01R 12/00 | (2006.01) |
|---|---|
| H01R 13/46 | (2006.01) |
| H01R 12/70 | (2011.01) |
| H01R 13/24 | (2006.01) |
| H01R 13/41 | (2006.01) |

(52) U.S. Cl.
CPC ......... *H01R 13/46* (2013.01); *H01R 12/7076* (2013.01); *H01R 13/2442* (2013.01); *H01R 13/41* (2013.01)

(58) Field of Classification Search
CPC .... H01R 13/46; H01R 13/2442; H01R 13/41; H01R 12/7076
USPC ........................................................ 439/658
See application file for complete search history.

(56) References Cited

U.S. PATENT DOCUMENTS

| 4,576,775 A * | 3/1986 | Kaeufer .................. B29C 43/36 |
|---|---|---|
| | | 264/323 |
| 4,741,874 A * | 5/1988 | Harrison ............. B29C 45/4005 |
| | | 264/161 |
| 6,345,987 B1 * | 2/2002 | Mori .................. H01R 13/2435 |
| | | 439/66 |
| 6,604,950 B2 * | 8/2003 | Maldonado .......... H05K 7/1069 |
| | | 439/591 |
| 6,686,007 B2 * | 2/2004 | Murphy .................. B29C 33/04 |
| | | 428/35.7 |
| 6,805,561 B1 * | 10/2004 | Walkup ............. H01R 13/2442 |
| | | 439/66 |

(Continued)

FOREIGN PATENT DOCUMENTS

| CN | 201294290 Y | 8/2009 |
|---|---|---|
| CN | 202004221 U | 10/2011 |

*Primary Examiner* — Abdullah A Riyami
*Assistant Examiner* — Vladimir Imas
(74) *Attorney, Agent, or Firm* — Locke Lord LLP; Tim Tingkang Xia, Esq.

(57) ABSTRACT

An electrical connector is used to electrically connect a chip module to a circuit board. The electrical connector has an insulating body, provided with multiple accommodating holes vertically penetrating through the insulating body. An upper surface of the insulating body protrudes upward to form a protruding block located between adjacent ones of the accommodating holes to support the chip module. The protruding block has a first ejector pin surface. The insulating body has a second ejector pin surface adjacent to the protruding block. The first ejector pin surface and the second ejector pin surface are provided for an ejector pin on a mold to push thereon so as to push the insulating body out of the mold. Multiple terminals are correspondingly accommodated in the accommodating holes to be electrically connected to the chip module.

20 Claims, 10 Drawing Sheets

(56) References Cited

U.S. PATENT DOCUMENTS

| | | | | |
|---|---|---|---|---|
| 6,824,396 B2 * | 11/2004 | Koopman | H01R 13/2435 | 439/71 |
| 6,843,659 B2 * | 1/2005 | Liao | H01R 13/2435 | 439/66 |
| 7,008,237 B1 | 3/2006 | Ma et al. | | |
| 7,322,829 B2 * | 1/2008 | Ma | H01R 13/2442 | 439/66 |
| 7,390,195 B2 * | 6/2008 | Liao | H01R 13/2435 | 439/66 |
| 7,427,203 B2 * | 9/2008 | Liao | H01R 12/57 | 439/66 |
| 7,435,100 B2 * | 10/2008 | Chang | H01R 13/2435 | 439/66 |
| 7,597,550 B2 * | 10/2009 | Lee | B29C 45/40 | 425/444 |
| 7,791,443 B1 * | 9/2010 | Ju | H01R 12/52 | 336/107 |
| 7,896,680 B2 * | 3/2011 | Szu | H01R 13/193 | 439/342 |
| 8,147,256 B2 * | 4/2012 | Jin | H01R 12/52 | 439/83 |
| 8,323,038 B2 * | 12/2012 | Jin | H01R 12/714 | 439/66 |
| 8,366,453 B2 * | 2/2013 | Chang | H01R 12/58 | 439/66 |
| 8,535,093 B1 * | 9/2013 | Mason | H01R 13/6585 | 439/607.05 |
| 8,647,153 B2 * | 2/2014 | Ju | H01R 12/714 | 439/626 |
| 8,814,603 B2 * | 8/2014 | Chang | H01R 24/00 | 439/626 |
| 8,851,904 B2 * | 10/2014 | Chang | H01R 12/71 | 439/607.03 |
| 8,932,080 B2 * | 1/2015 | Chang | H05K 7/1069 | 439/607.1 |
| 9,088,084 B2 * | 7/2015 | Liao | H01R 13/41 | |
| 9,106,022 B2 * | 8/2015 | Cai | H01R 13/6471 | |
| 9,437,948 B2 * | 9/2016 | Ju | H01R 12/7076 | |
| 9,806,444 B1 * | 10/2017 | Ju | H01R 12/585 | |
| 9,837,737 B1 * | 12/2017 | Huang | H01R 12/7076 | |
| 9,917,386 B1 * | 3/2018 | Ju | H01R 12/52 | |
| 10,027,061 B2 * | 7/2018 | Avery | H01R 13/2442 | |
| 10,050,387 B1 * | 8/2018 | Wu | H01R 43/20 | |
| 10,062,982 B2 * | 8/2018 | Ju | H01R 12/57 | |
| 10,122,111 B1 * | 11/2018 | Ju | H01R 12/7076 | |
| 10,199,756 B2 * | 2/2019 | Ju | H01R 13/2435 | |
| 10,230,177 B2 * | 3/2019 | Ju | H01R 13/2442 | |
| 10,276,956 B2 * | 4/2019 | Huang | H01R 12/52 | |
| 2005/0020098 A1 * | 1/2005 | Ramey | H01R 13/2442 | 439/66 |
| 2007/0134366 A1 * | 6/2007 | Wang | B29C 45/4005 | 425/556 |

* cited by examiner

ELECTRICAL CONNECTOR

CROSS-REFERENCE TO RELATED PATENT APPLICATION

This non-provisional application claims priority to and the benefit of, pursuant to 35 U.S.C. § 119(a), patent application Serial No. CN201810227323.2 filed in China on Mar. 20, 2018. The disclosure of the above application is incorporated herein in its entirety by reference.

Some references, which may include patents, patent applications and various publications, are cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference were individually incorporated by reference.

FIELD

The present invention relates to an electrical connector, and more particularly to an electrical connector for electrically connecting a chip module to a circuit board.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

An existing electrical connector configured to connect a chip module to a circuit board includes an insulating body. The insulating body is provided with a plurality of accommodating slots penetrating an upper surface and a lower surface of the insulating body. A plurality of terminals are retained in the accommodating slots. One end of each terminal abuts the chip module, and the other end is electrically connected to the circuit board, thereby realizing the electrical conduction of the chip module and the circuit board. A partition is provided between two adjacent accommodating slots. A protruding block protrudes upward from the partition. When in use, the chip module is installed on the electrical connector, then a downward acting force is applied to the chip module, such that the chip module downward abuts the terminals, thereby ensuring good contact between the chip module and the terminal. Since the protruding block supports the chip module upward, the chip module can be prevented from being crushed, and the excessive deformation of the terminal when being pressed can be prevented. In the molding process of the insulating body, the insulating body is injection-molded in a mold. After the injection molding is completed, the insulating body needs to be separated from the mold, and an ejector pin is used to push the partition so as to separate the insulating body and the mold. However, with the intensive development of the terminals of the electrical connector, the size of the partition between the terminals becomes smaller. In order to ensure the strength of the ejector pin, the size of the ejector pin is generally greater, thus leading to that the ejector pin cannot completely push against the partition in a smaller size.

Therefore, a heretofore unaddressed need to design a novel electrical connector exists in the art to address the aforementioned deficiencies and inadequacies.

SUMMARY

In view of the above deficiencies in the background, the present invention is directed to an electrical connector facilitating the intensive development of terminals.

To achieve the foregoing objective, the present invention adopts the following technical solutions.

An electrical connector is configured to electrically connect a chip module to a circuit board. The electrical connector includes: an insulating body, provided with a plurality of accommodating holes vertically penetrating through the insulating body, wherein an upper surface of the insulating body protrudes upward to form a protruding block located between adjacent ones of the accommodating holes and configured to support the chip module, the protruding block has a first ejector pin surface, the insulating body has a second ejector pin surface adjacent to the protruding block, and the first ejector pin surface and the second ejector pin surface are configured for an ejector pin on a mold to push thereon so as to push the insulating body out of the mold; and a plurality of terminals, correspondingly accommodated in the accommodating holes and configured to be electrically connected to the chip module.

In certain embodiments, the protruding block has a side surface located between the first ejector pin surface and the second ejector pin surface, and the first ejector pin surface and the second ejector pin surface are respectively located at two sides of the side surface.

In certain embodiments, two opposite ends of the side surface are respectively connected with the first ejector pin surface and the second ejector pin surface.

In certain embodiments, the protruding block has a first portion connected to the upper surface and a second portion protruding upward from the first portion.

In certain embodiments, the first ejector pin surface is provided on the first portion.

In certain embodiments, a third ejector pin surface is formed on an upper surface of the second portion and configured for the ejector pin to push thereon.

In certain embodiments, the first ejector pin surface is located between the second portion and the second ejector pin surface.

In certain embodiments, an upper surface of the first portion forms the first ejector pin surface.

In certain embodiments, a plurality of protruding blocks and a plurality of first ejector pin surfaces are provided, and the first ejector pin surfaces are only provided on some of the protruding blocks.

In certain embodiments, the insulating body has a plurality of second ejector pin surfaces, and a quantity of the second ejector pin surface is identical to a quantity of the first ejector pin surface.

In certain embodiments, the second ejector pin surface is located between the protruding block and the accommodating holes.

In certain embodiments, a recess is downward concavely provided on the upper surface of the insulating body, and the second ejector pin surface is formed on a bottom surface of the recess.

In certain embodiments, the recess is adjacent to the protruding block.

In certain embodiments, the protruding block has a supporting surface configured to support the chip module, and the first ejector pin surface and the supporting surface are staggeredly provided.

In certain embodiments, the second ejector pin surface is located lower than the upper surface of the insulating body, and the first ejector pin surface is located higher than the upper surface of the insulating body.

An electrical connector is configured to electrically connect a chip module to a circuit board. The electrical connector includes: an insulating body, provided with a plurality of accommodating holes vertically penetrating through the insulating body, wherein two adjacent ones of the accommodating holes are separated by a partition, the insulating body is provided with a protruding block protruding upward from the partition and configured to support the chip module, the protruding block is provided with a first ejector pin surface, the partition has a second ejector pin surface adjacent to the protruding block, and the second ejector pin surface and the first ejector pin surface are configured for an ejector pin to push thereon so as to push the insulating body out of a mold; and a plurality of terminals, correspondingly accommodated in the accommodating holes and configured to be electrically connected to the chip module.

In certain embodiments, the protruding block has a first portion connected to the partition and a second portion protruding upward from the first portion, and the first ejector pin surface is provided on the first portion.

In certain embodiments, an upper surface of the first portion forms the first ejector pin surface.

In certain embodiments, a plurality of protruding blocks and a plurality of first ejector pin surfaces are provided, the first ejector pin surfaces are only provided on some of the protruding blocks, the insulating body has a plurality of second ejector pin surfaces, and a quantity of the second ejector pin surface is identical to a quantity of the first ejector pin surface.

In certain embodiments, a recess is downward concavely provided on the upper surface of the insulating body, the second ejector pin surface is formed on a bottom surface of the recess, and the recess is adjacent to the protruding block.

Compared with the related art, certain embodiments of the present invention has the following beneficial effects.

In the electrical connector according to certain embodiments of the present invention, the first ejector pin surface is provided on the protruding block, and the second ejector pin surface is provided on the partition and adjacent to the protruding block. The first ejector pin surface and the second ejector pin surface are simultaneously provided for the ejector pin to push, such that the ejector pin does not need to completely push against the partition. Thus, the size of the partition can be reduced, thereby narrowing a gap between the terminals, and facilitating the intensive design of the terminals of the electrical connector.

These and other aspects of the present invention will become apparent from the following description of the preferred embodiment taken in conjunction with the following drawings, although variations and modifications therein may be effected without departing from the spirit and scope of the novel concepts of the disclosure.

BRIEF DESCRIPTION OF THE DRAWINGS

The accompanying drawings illustrate one or more embodiments of the disclosure and together with the written description, serve to explain the principles of the disclosure. Wherever possible, the same reference numbers are used throughout the drawings to refer to the same or like elements of an embodiment, and wherein.

DETAILED DESCRIPTION

Figure 1:
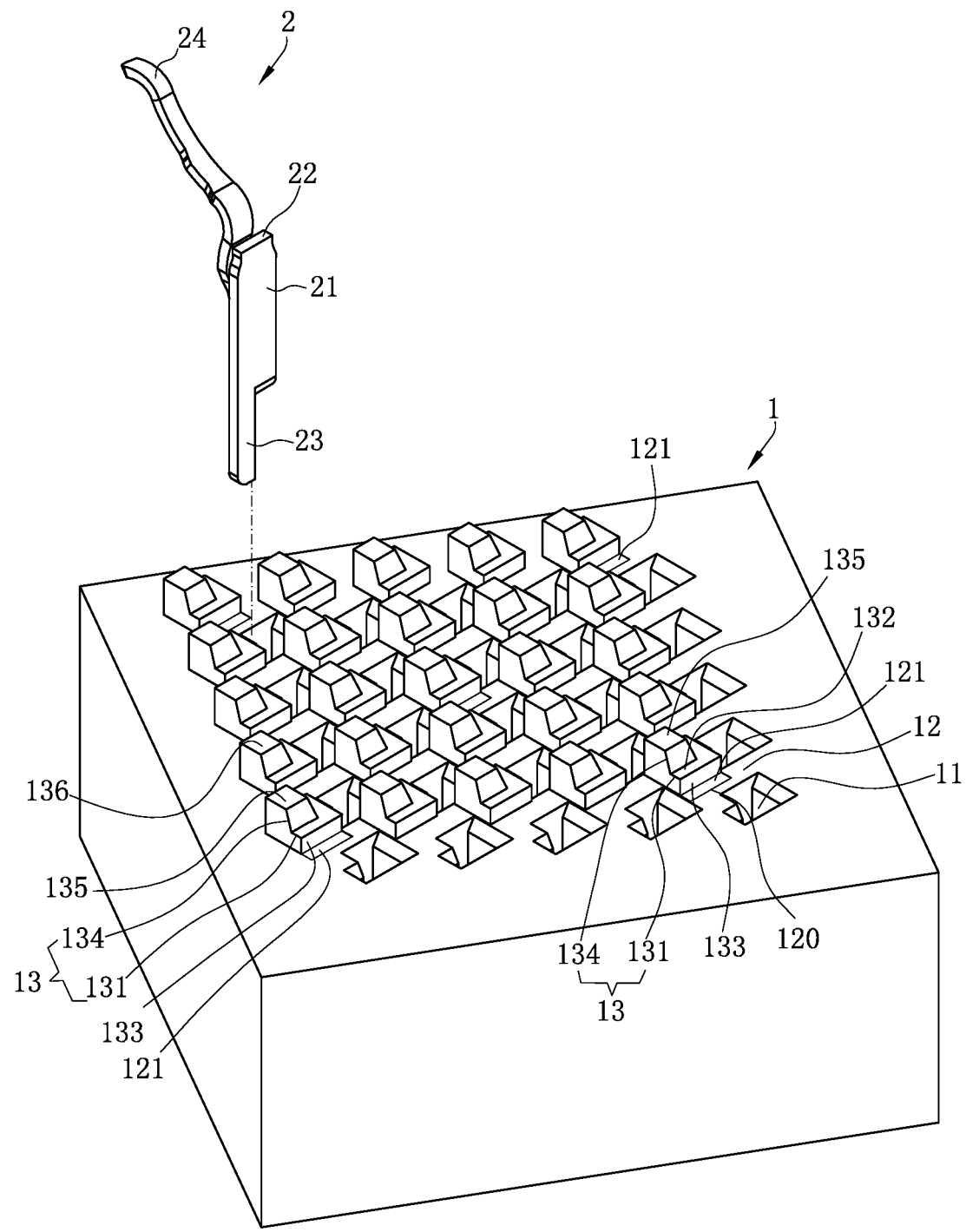
FIG. 1 is a perspective view of a terminal matching with an insulating body of an electrical connector according to a first embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present invention.

It will be understood that when an element is referred to as being "on" another element, it can be directly on the other element or intervening elements may be present therebetween. In contrast, when an element is referred to as being "directly on" another element, there are no intervening elements present. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending of the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the terms "comprising", "including", "carrying", "having", "containing", "involving", and the like are to be understood to be open-ended, i.e., to mean including but not limited to.

The description will be made as to the embodiments of the present invention in conjunction with the accompanying drawings in FIGS. 1-10. In accordance with the purposes of this invention, as embodied and broadly described herein, this invention, in one aspect, relates to an electrical connector.

FIG. 1 to FIG. 5 show an electrical connector 100 according to a first embodiment of the present invention. The electrical connector 100 is a land grid array (LGA) socket connector configured to electrically connect a chip module 200 to a circuit board 300, and includes an insulating body 1 (where only a portion of the insulating body as a real product is shown in the figures; same below); and a plurality of terminals 2 accommodated in the insulating body 1.

Figure 2:
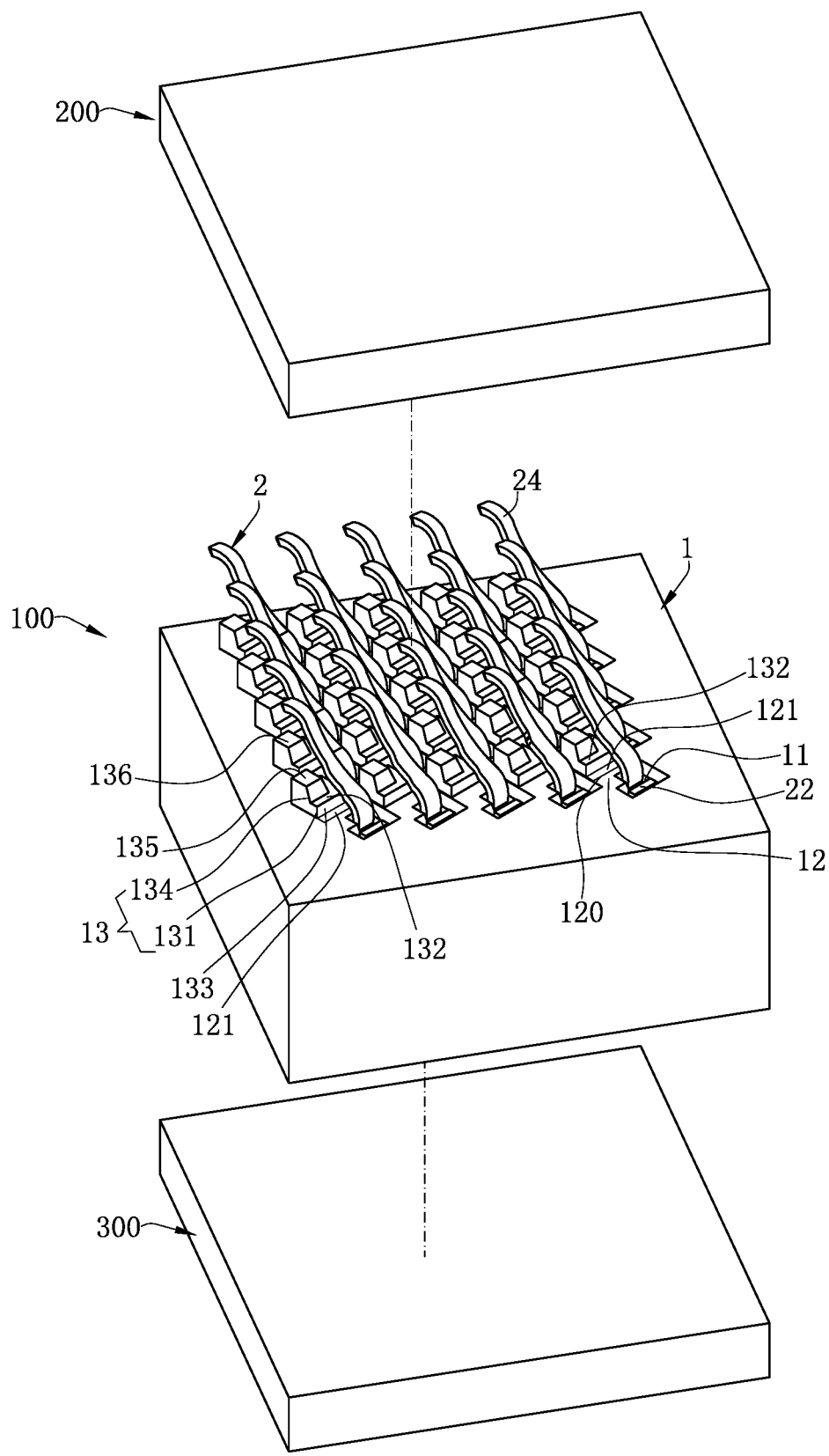
FIG. 2 is a perspective view of an electrical connector matching with a chip module and a circuit board according to the first embodiment of the present invention.

As shown in FIG. 1 and FIG. 2, the terminal 2 has a base 21. A strip connecting portion 22 extends upward from an upper end of the base 21 to be connected to a strip (not shown). A soldering portion 23 extends downward from a lower end of the base 21. The soldering portion 23 is configured to be soldered to the circuit board 300 through a solder material (not shown, same below). One side of the soldering portion 23 is torn to form an elastic arm 24 which bends upward and forward and extends out of the insulating body 1 to be in contact with the chip module 200.

Figure 3:
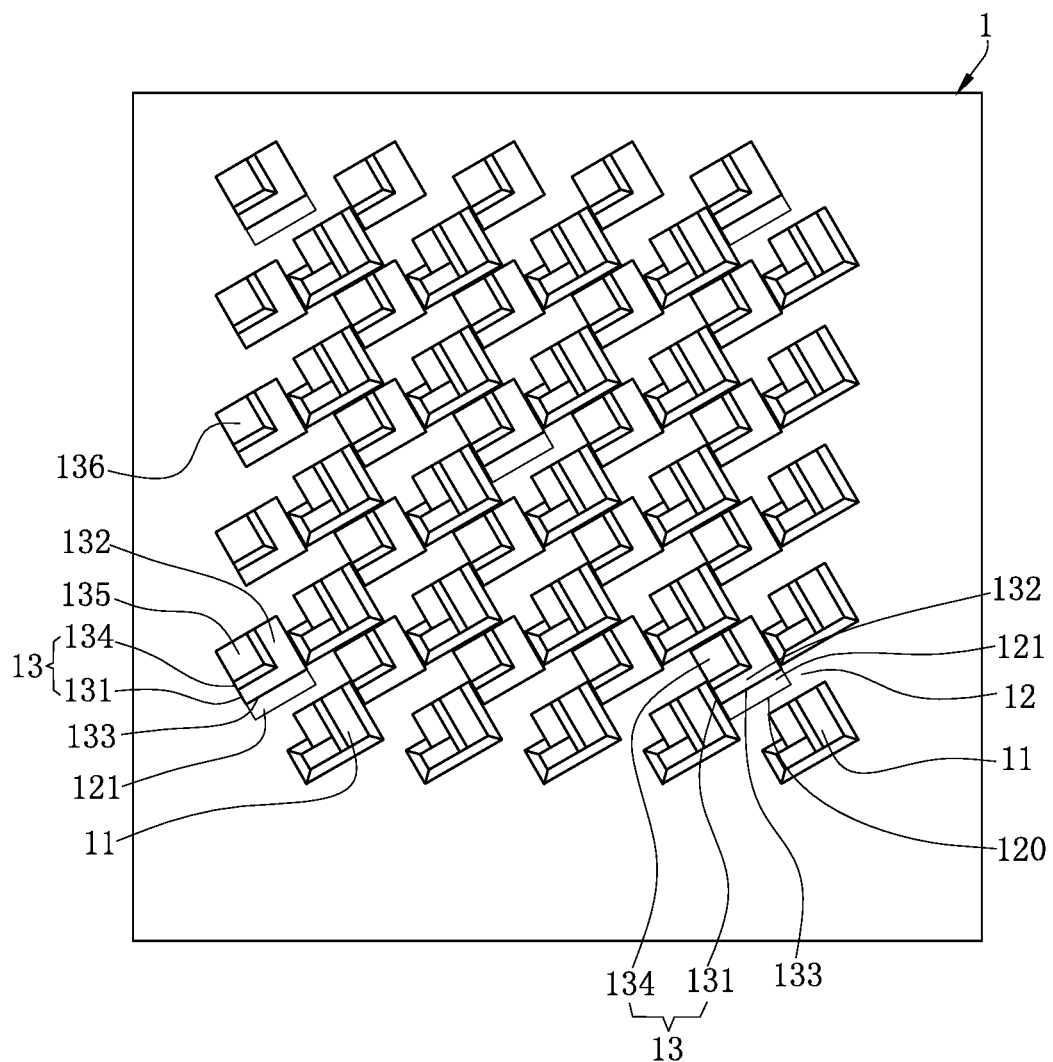
FIG. 3 is a top view of the insulating body in FIG. 1.

As shown in FIG. 1 and FIG. 3, the insulating body 1 has a plurality of accommodating holes 11 which vertically run through the insulating body and are arranged in matrix. The base 21 is correspondingly clamped in an accommodating hole 11. The two adjacent accommodating holes 11 in a front-rear direction are separated by a partition 12. The partition 12 between the two adjacent accommodating holes 11 protrudes upward to form a protruding block 13. The protruding block 13 has a first portion 131 which is in a cuboid shape and is connected to the partition 12. The first portion 131 is located adjacent to the accommodating hole 11 at the front side thereof and is away from the accommodating hole 11 at the rear side thereof. The first portion 131 has a side surface 133 facing the accommodating hole 11 at the rear side thereof. A second portion 134 protrudes upward from a left-front corner of the upper surface of the first portion 131. The second portion 134 is in a trapezoidal platform shape. A front side surface and a left side surface of the second portion 134 are respectively coplanar with the front side surface and the left side surface of the first portion 131.

As shown in FIG. 1 and FIG. 3, portions of the rear side and the right side of the upper surface of the first portion 131 which are not pressed and covered by the second portion 134 form a first ejector pin surface 132. The first ejector pin surface 132 is in an L shape surrounding the rear side and the right side of the second portion 134. The upper surface of the second portion 134 forms a third ejector pin surface 135. The partition 12 between the protruding block 13 and the accommodating hole 11 at the rear side thereof is downward concavely provided with a recess 120. The recess 120 is adjacent to the protruding block 13, and a length of the recess 120 is the same as a length of the protruding block 13. A bottom surface of the recess 120 forms a second ejector pin surface 121. The upper end and the lower end of the side surface 133 are respectively connected with the first ejector pin surface 132 and the second ejector pin surface 121.

Figure 4:
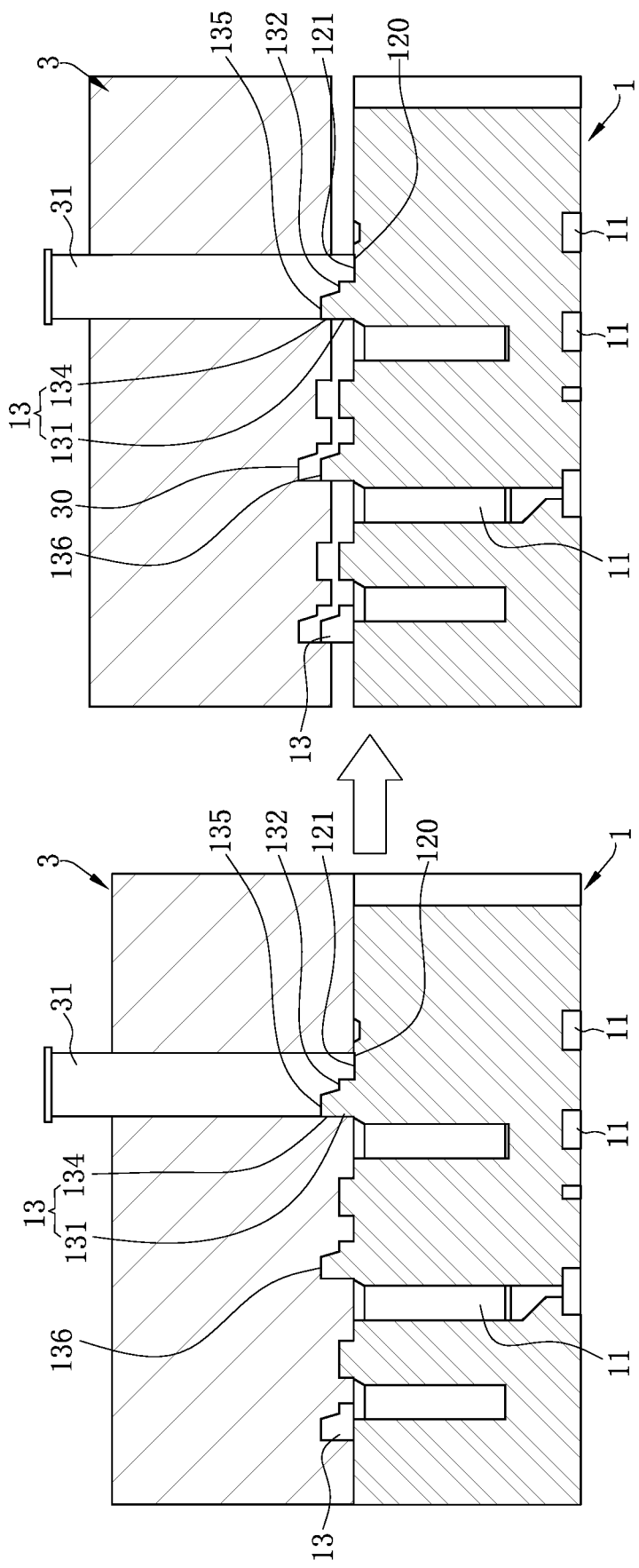
FIG. 4 is a side sectional view of the insulating body in FIG. 3 being ejected out of a mold by an ejector pin.
Figure 5:
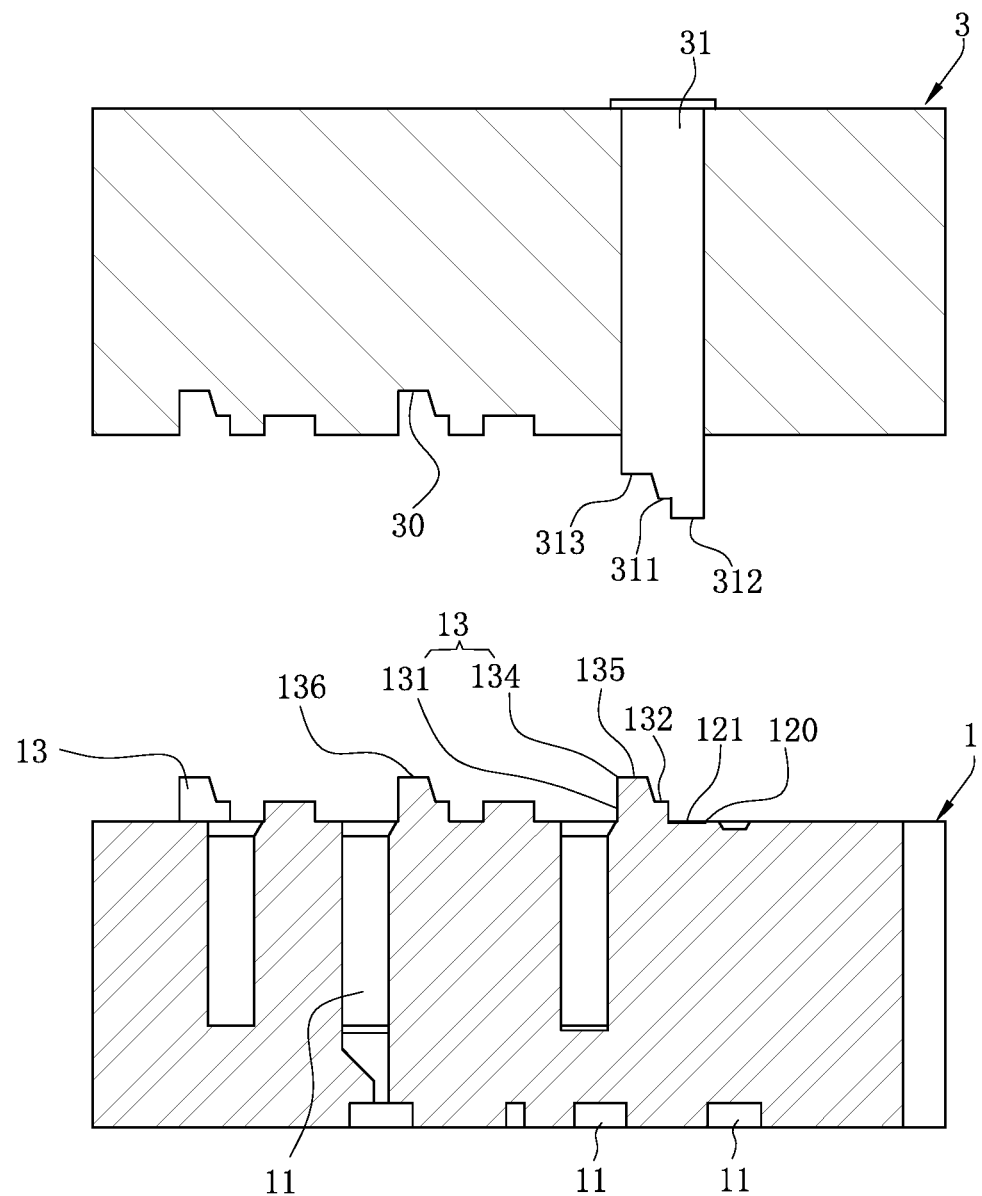
FIG. 5 is a side sectional view of the insulating body in FIG. 4 after being ejected out of the mold.
Figure 6:
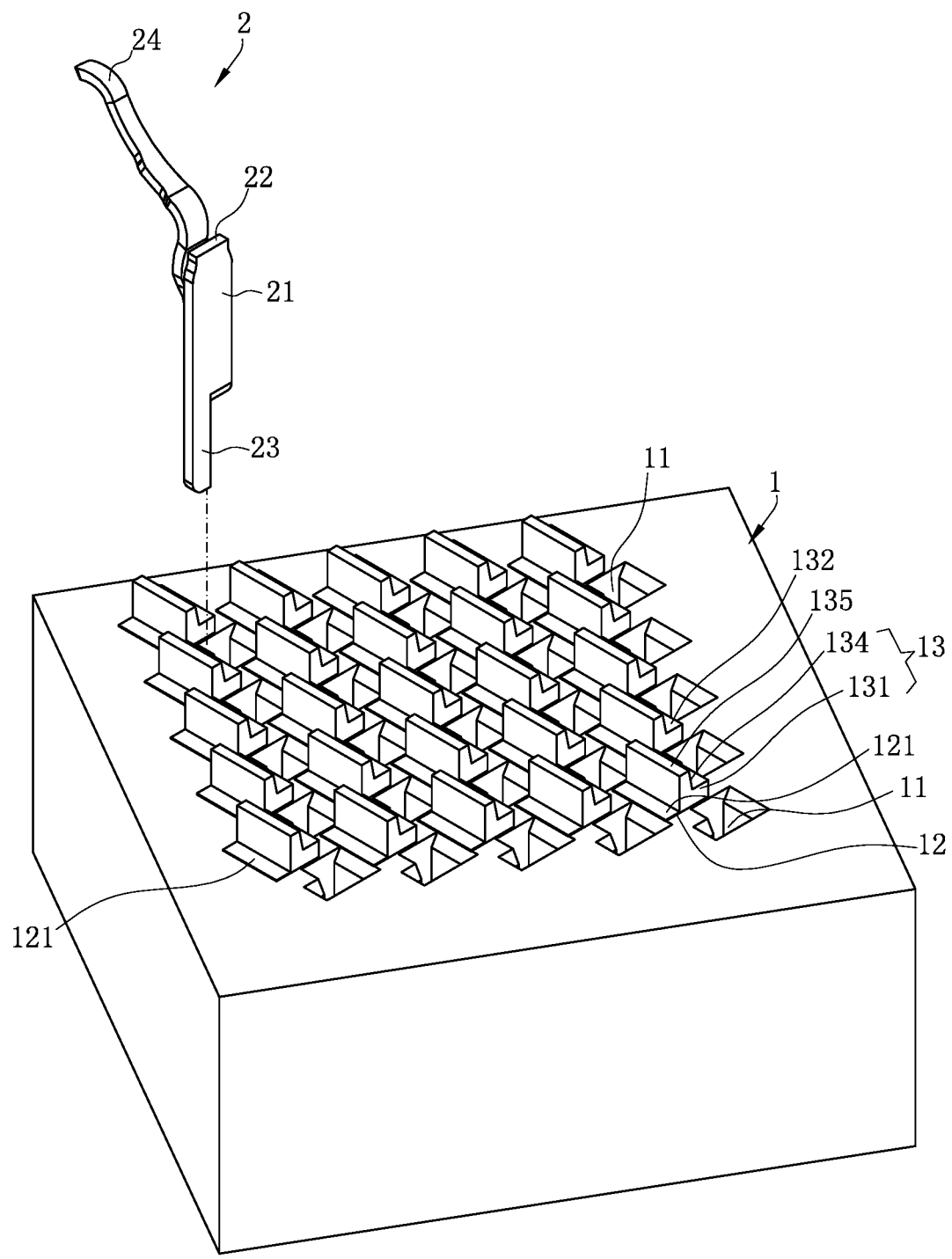
FIG. 6 is a perspective view of a terminal matching with an insulating body of an electrical connector according to a second embodiment of the present invention.
Figure 7:
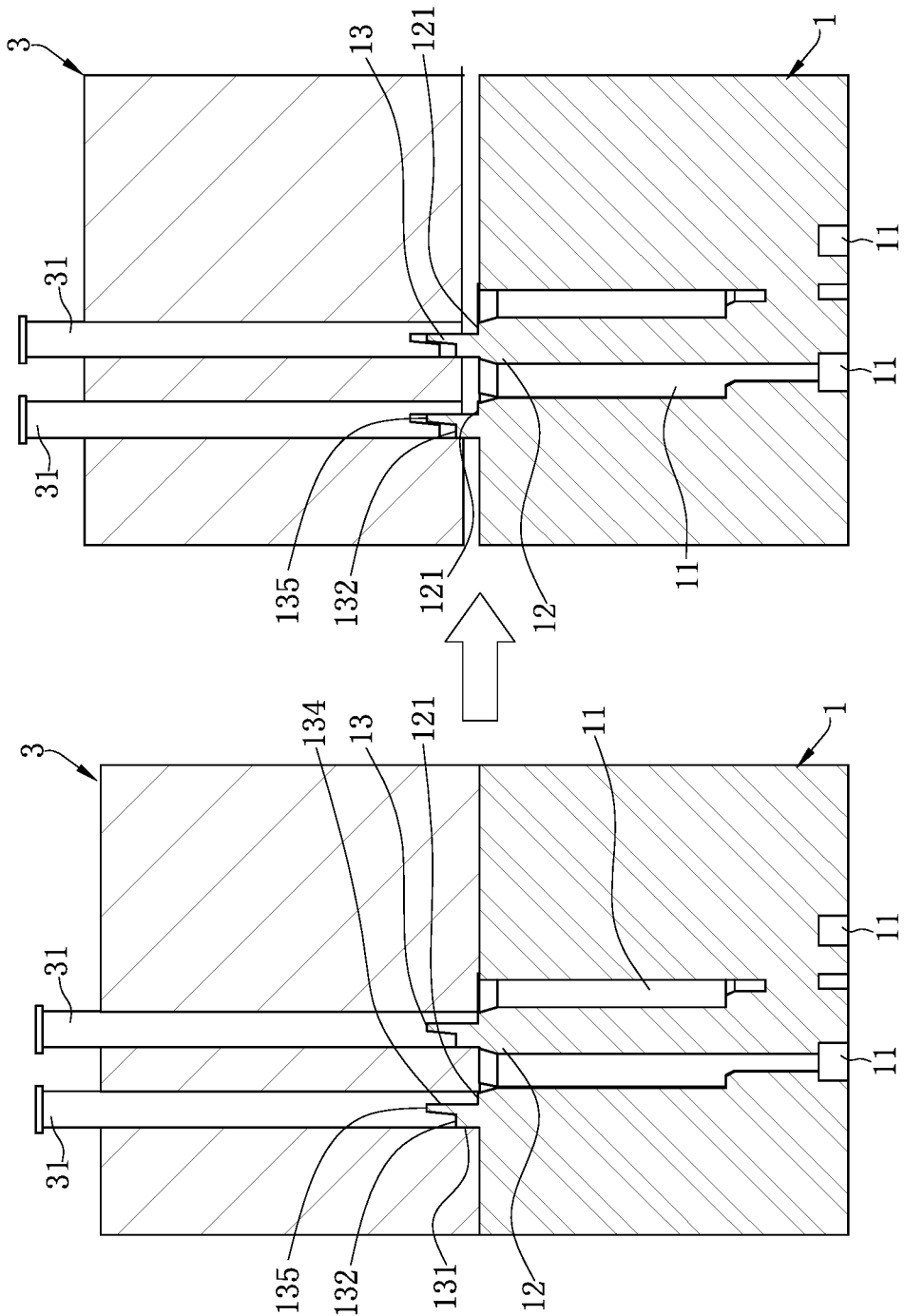
FIG. 7 is a side sectional view of the insulating body in FIG. 6 being ejected out of a mold, where the sectional position is parallel to a width direction of a protruding block.
Figure 8:
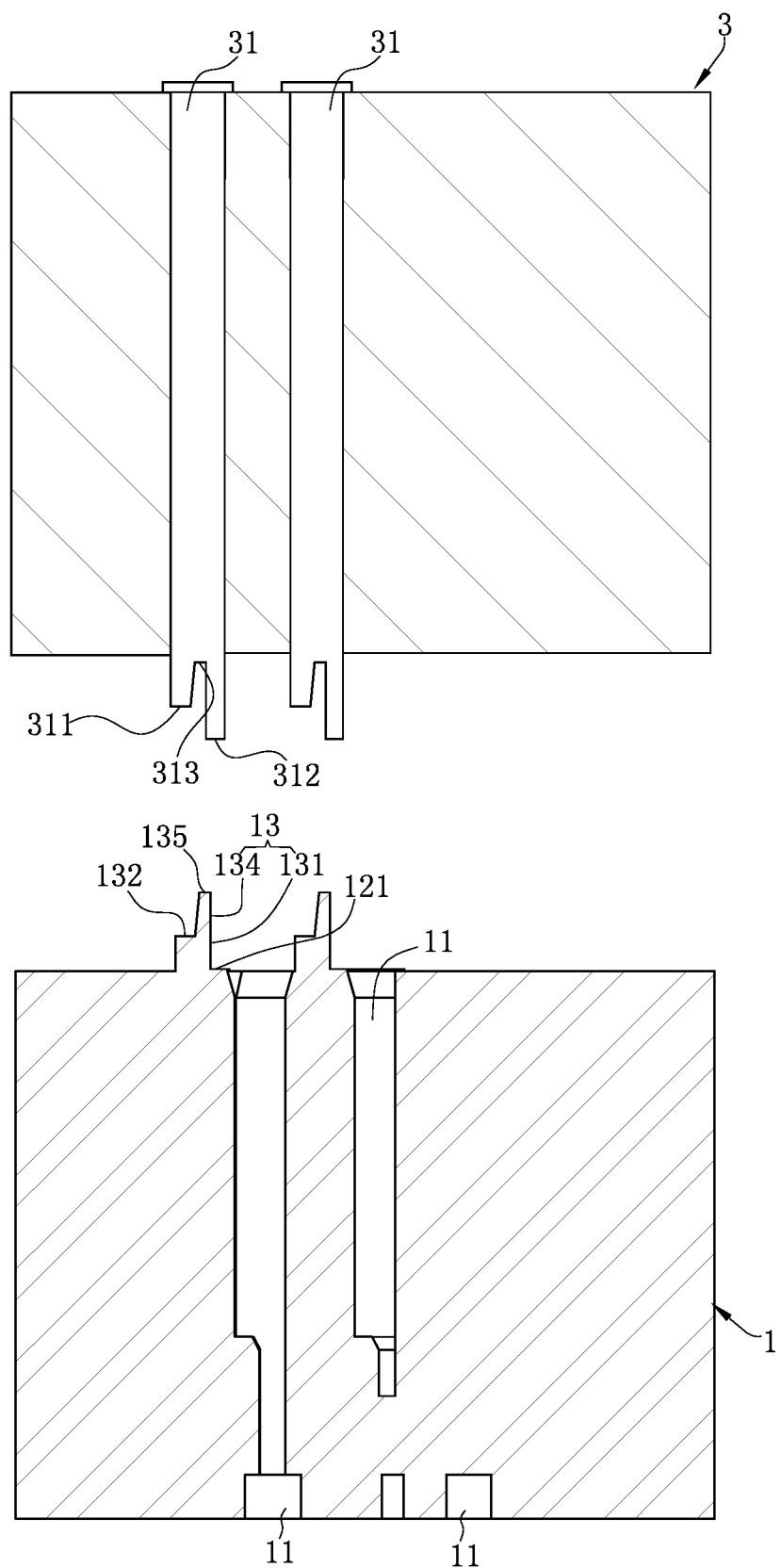
FIG. 8 is a side sectional view of the insulating body in FIG. 7 after being ejected out of the mold.
Figure 9:
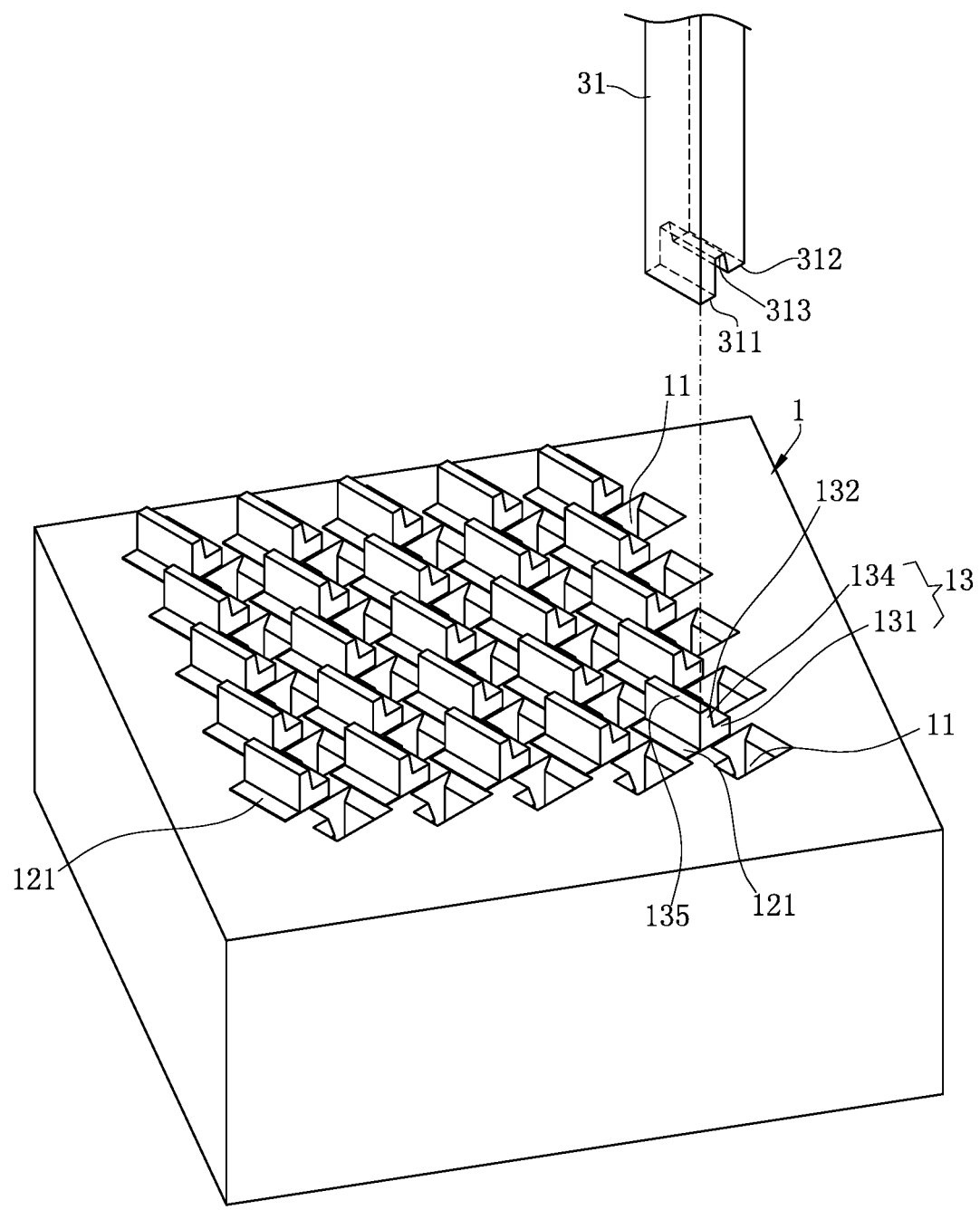
FIG. 9 is a perspective view of the insulating body matching with an ejector pin in FIG. 8.
Figure 10:
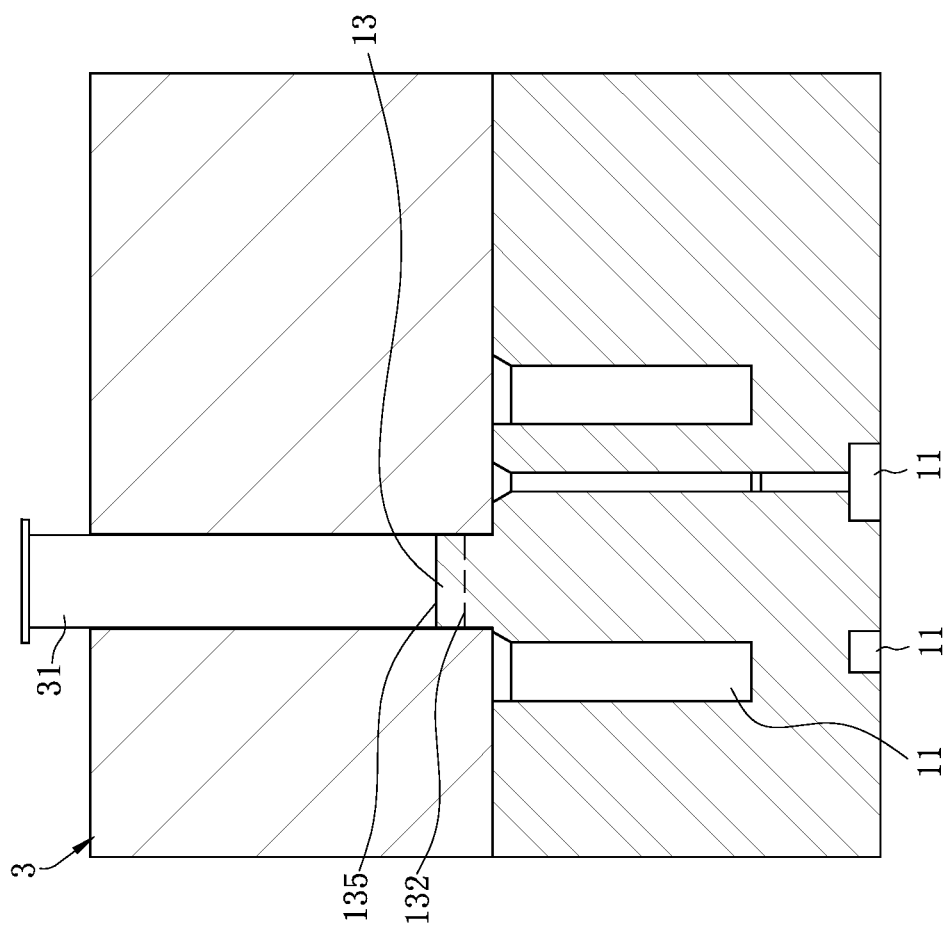
FIG. 10 is a side sectional view of the insulating body and the mold in FIG. 7 along another direction, where the sectional position is parallel to a length direction of the protruding block.

As shown in FIG. 3, FIG. 4 and FIG. 5, in the present embodiment, the protruding blocks 13 are in one-to-one correspondence with the accommodating holes 11. The first ejector pin surfaces 132 are only arranged on the first portion 131 of some of the protruding blocks 13. The quantities of the first ejector pin surfaces 132, the second ejector pin surfaces 121 and the third ejector pin surfaces 135 are identical, such that each first ejector pin surface 132 corresponds to one second ejector pin surface 121 and one third ejector pin surface 135. The first ejector pin surface 132 and the third ejector pin surface 135 on a same protruding block 13 and the adjacent second ejector pin surface 121 are jointly configured for a same ejector pin 31 in one mold 3 to push thereon so as to provide a large stressed area to jointly receive a thrust force of the ejector pin 31.

Referring to FIG. 4 and FIG. 5, when the insulating body 1 is molded, molten plastic (not shown, the same below) flows into the mold 3 to fill the mold 3. A plurality of mold core surfaces 30 of the mold 3 and a first thrust surface 311, a second thrust surface 312 and a third thrust surface 313 of the ejector pin 31 limit the upward overflow of the molten plastic. Meanwhile, air in the mold 3 can be discharged along a gap (not numbered, same below) between the ejector pin 31 and the mold 3. When the molten plastic is solidified to form the insulating body 1, the mold core surfaces 30 just correspond to a plurality of supporting surfaces 136 on the protruding blocks 13. That is, the mold core surfaces 30 correspondingly form the plurality of supporting surfaces 136, the first thrust surface 311 correspondingly forms the first ejector pin surface 132, the second thrust surface 312 correspondingly forms the second ejector pin surface 121, and the third thrust surface 313 correspondingly forms the third ejector pin surface 135. When the ejector pin 31 pushes the insulating body 1 out of the mold 3, the first thrust surface 311 pushes against the first ejector pin surface 132, the second thrust surface 312 pushes against the second ejector pin surface 121, and the third thrust surface 313 pushes against the third ejector pin surface 135. Referring to FIG. 2, all supporting surfaces 136 are then configured to support the chip module 200, and the third ejector pin surface 135 can also play a role in supporting the chip module 200.

FIG. 6 to FIG. 10 show an electrical connector 100 according to a second embodiment of the present invention. The second embodiment differs from the first embodiment in that: the protruding block 13 extends from the accommodating hole 11 at the front side thereof to the accommodating hole 11 at the rear side thereof, the second ejector pin surface 121 is provided on the partition 12 between the protruding block 13 and the accommodating hole 11 at the left side thereof, and the second portion 134 extends upward from a left-half portion of the upper surface of the first portion 131, such that along a horizontal direction, the second portion 134 is located between the first ejector pin surface 132 and the second ejector pin surface 121.

In other embodiments (not shown), only the first ejector pin surface 132 and the second ejector pin surface 121 are provided, and the third ejector pin surface 135 is not provided. In this case, the first ejector pin surface 132 can also be provided on the second portion 134. The protruding block 13 can also include only the first portion 131 and not the second portion 134, such that the structure of the protruding block 13 is simpler. In this case, the first ejector pin surface 132 can be provided directly on the upper surface of the protruding block 13. The first ejector pin surface 132 can also be formed by downward concavely provided on an oblique surface of the protruding block 13. Similarly, the second ejector pin surface 121 can also be formed by downward concavely provided on an oblique surface of the partition 12.

To sum up, the electrical connector 100 according to certain embodiments of the present invention has the following beneficial effects.

1. The first ejector pin surface 132 is provided on the protruding block 13. The partition 12 is downward concavely provided with the second ejector pin surface 121 adjacent to the protruding block 13. The first ejector pin surface 132 and the second ejector pin surface 121 are jointly configured for the ejector pin 31 to push thereon, such that the ejector pin 31 does not need to completely push against the partition 12. Thus, the size of the partition 12 can be reduced, thereby narrowing a space between the terminals 2, and facilitating the intensive design of the terminals 2 of the electrical connector 100.

2. The first ejector pin surface 132 is provided on the first portion 131 or the second portion 134 of the protruding block 13. When the area of the upper surface of the first portion 131 is large, the first ejector pin surface 132 can be provided on the first portion 131. When the area of the upper surface of the second portion 134 is large, the first ejector pin surface 132 can be provided on the second portion 134. Thus, the first ejector pin surface 132 can be provided on an appropriate position of the protruding block 13.

3. The two opposite ends of the side surface 133 are respectively connected with the first ejector pin surface 132 and the second ejector pin surface 121, such that the ejector pin 31 is lined up with the side surface 133. When the protruding block 13 is molded, the air can be discharged from the gap between the ejector pin 31 and the mold 3, thereby preventing from an air gap being formed between the protruding block 13 and the ejector pin 31, which may result in short molding of the protruding block 13.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. An electrical connector configured to electrically connect a chip module to a circuit board, comprising:
   an insulating body, provided with a plurality of accommodating holes vertically penetrating through the insulating body, wherein an upper surface of the insulating body protrudes upward to form a protruding block located between adjacent ones of the accommodating holes and configured to support the chip module, the protruding block has a first ejector pin surface, the insulating body has a second ejector pin surface adjacent to the protruding block, and the first ejector pin surface and the second ejector pin surface are configured for an ejector pin on a mold to push thereon so as to push the insulating body out of the mold; and
   a plurality of terminals, correspondingly accommodated in the accommodating holes and configured to be electrically connected to the chip module.

2. The electrical connector according to claim 1, wherein the protruding block has a side surface located between the first ejector pin surface and the second ejector pin surface, and the first ejector pin surface and the second ejector pin surface are respectively located at two sides of the side surface.

3. The electrical connector according to claim 2, wherein two opposite ends of the side surface are respectively connected with the first ejector pin surface and the second ejector pin surface.

4. The electrical connector according to claim 1, wherein the protruding block has a first portion connected to the upper surface and a second portion protruding upward from the first portion.

5. The electrical connector according to claim 4, wherein the first ejector pin surface is provided on the first portion.

6. The electrical connector according to claim 5, wherein a third ejector pin surface is formed on an upper surface of the second portion and configured for the ejector pin to push thereon.

7. The electrical connector according to claim 5, wherein the first ejector pin surface is located between the second portion and the second ejector pin surface.

8. The electrical connector according to claim 4, wherein an upper surface of the first portion forms the first ejector pin surface.

9. The electrical connector according to claim 1, wherein a plurality of protruding blocks and a plurality of first ejector pin surfaces are provided, and the first ejector pin surfaces are only provided on some of the protruding blocks.

10. The electrical connector according to claim 9, wherein the insulating body has a plurality of second ejector pin surfaces, and a quantity of the second ejector pin surfaces is identical to a quantity of the first ejector pin surfaces.

11. The electrical connector according to claim 1, wherein the second ejector pin surface is located between the protruding block and the accommodating holes.

12. The electrical connector according to claim 1, wherein a recess is downward concavely provided on the upper surface of the insulating body, and the second ejector pin surface is formed on a bottom surface of the recess.

13. The electrical connector according to claim 12, wherein the recess is adjacent to the protruding block.

14. The electrical connector according to claim 1, wherein the protruding block has a supporting surface configured to support the chip module, and the first ejector pin surface and the supporting surface are staggeredly provided.

15. The electrical connector according to claim 1, wherein the second ejector pin surface is located lower than the upper surface of the insulating body, and the first ejector pin surface is located higher than the upper surface of the insulating body.

16. An electrical connector configured to electrically connect a chip module to a circuit board, comprising:
   an insulating body, provided with a plurality of accommodating holes vertically penetrating through the insulating body, wherein two adjacent ones of the accommodating holes are separated by a partition, the insulating body is provided with a protruding block protruding upward from the partition and configured to support the chip module, the protruding block is provided with a first ejector pin surface, the partition has a second ejector pin surface adjacent to the protruding block, and the second ejector pin surface and the first ejector pin surface are configured for an ejector pin to push thereon so as to push the insulating body out of a mold; and a plurality of terminals, correspondingly accommodated in the accommodating holes and configured to be electrically connected to the chip module.

17. The electrical connector according to claim 16, wherein the protruding block has a first portion connected to the partition and a second portion protruding upward from the first portion, and the first ejector pin surface is provided on the first portion.

18. The electrical connector according to claim 17, wherein an upper surface of the first portion forms the first ejector pin surface.

19. The electrical connector according to claim 16, wherein a plurality of protruding blocks and a plurality of first ejector pin surfaces are provided, the first ejector pin surfaces are only provided on some of the protruding blocks, the insulating body has a plurality of second ejector pin surfaces, and a quantity of the second ejector pin surface is identical to a quantity of the first ejector pin surface.

20. The electrical connector according to claim 16, wherein a recess is downward concavely provided on the upper surface of the insulating body, the second ejector pin surface is formed on a bottom surface of the recess, and the recess is adjacent to the protruding block.

* * * * *